Patented Feb. 12, 1924.

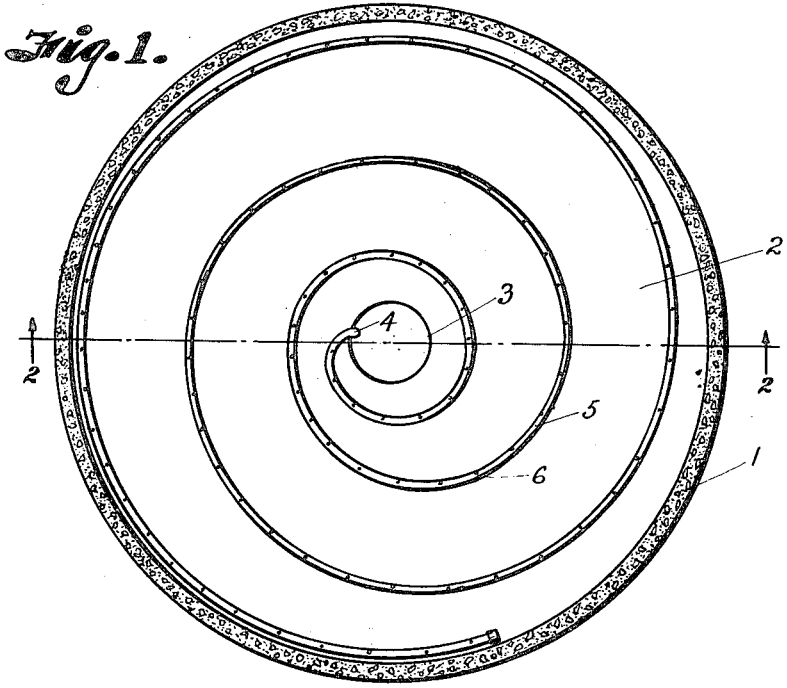
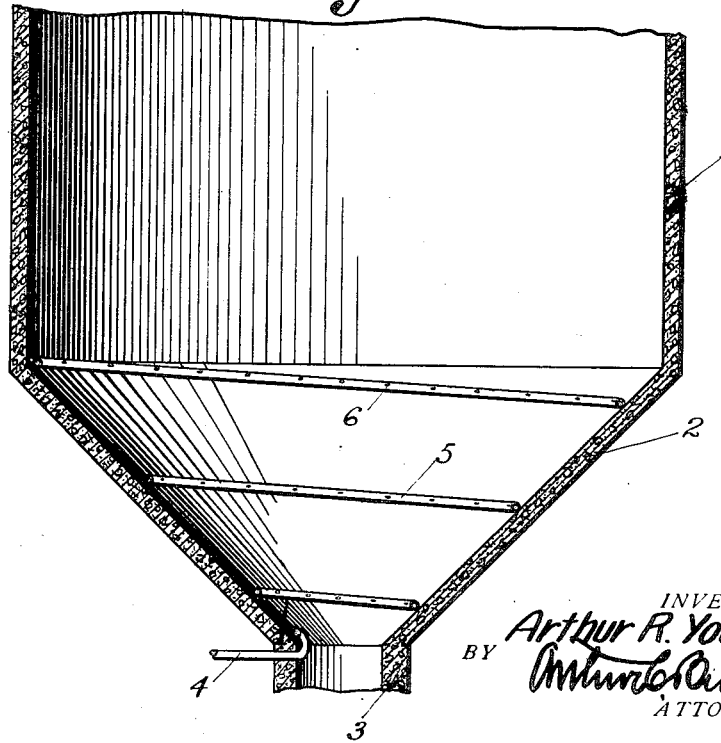

1,483,406

UNITED STATES PATENT OFFICE.

ARTHUR R. YOUNG, OF KANSAS CITY, MISSOURI, ASSIGNOR TO A. R. YOUNG MATERIAL COMPANY, OF KANSAS CITY, MISSOURI, A CORPORATION OF MISSOURI.

METHOD AND APPARATUS FOR FUMIGATING GRAIN.

Application filed April 6, 1923. Serial No. 630,259.

*To all whom it may concern:*

Be it known that I, ARTHUR R. YOUNG, a citizen of the United States, residing at Kansas City, in the county of Jackson and State of Missouri, have invented certain new and useful Improvements in Methods and Apparatus for Fumigating Grain; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a method of fumigating grain.

It is difficult to keep insects out of grain while it is in the farmers' bins, preparatory to shipping it to the central receiving stations or elevators. When grain containing insects is received at the elevator, the purchasing price is reduced materially so it is important that the means be provided for taking care of the grain before it leaves the elevator.

My invention contemplates a provision of a simple method for treating the grain so as to prevent as well as to destroy insects. A fumigant is introduced into the body or mass of wheat at a plurality of separate points so that the fumigant can thoroughly co-mingle with the wheat grains and reduce the liability of insects getting into the grain or if they are present, to destroy them.

One form of simple apparatus used for carrying out the method is illustrated in the accompanying drawings, in which—

Fig. 1 is a top plan view of a bin constructed in accordance with my invention, and Fig. 2 is a fragmentary, vertical, sectional view through the same.

In carrying out the method I may employ a bin 1 having a hopper bottom 2 with an outlet 3. Entering the lower portion of the hopper 2 is an inlet pipe 4, preferably coiled in the form of a spiral of successively increasing convolutes, the spiral being indicated at 5. The convolutes have spray openings 6 at fixed intervals so that when the fumigant is passed through the pipe 4, it will thoroughly co-mingle with the grain.

In actual practice I prefer to use hydrocyanic acid (HCN). The hydrocyanic acid is introduced into the pipe 4 in the form of a liquid and sprayed through the spray openings 6 and as these are spaced at definite distances apart and since the pipe passes around in the form of a spiral, it will be apparent that there can be a uniform distribution of the fumigant throughout the mass so that insects will not get into the grain or, if they are already present, they will be destroyed. The fumigant acts as an insecticide and obviously, it will serve as a fungicide to prevent the accumulation of fungus growths.

The form of pipe need not necessarily be a spiral but I find it convenient to form it thus in connection with a simple form of bin such as would be used by wheat growers and I, therefore, recommend the form shown.

What I claim and desire to secure by Letters Patent is:

The herein described method of fumigating grain, which consists in collecting the grain in a receptacle and subjecting it to the action of hydrocyanic acid introduced within the mass of grain in the form of a spray.

In testimony whereof I affix my signature.

ARTHUR R. YOUNG.